(12) United States Patent
Kaminski et al.

(10) Patent No.: US 6,977,460 B1
(45) Date of Patent: Dec. 20, 2005

(54) SPACER FOR AXIAL SPACING ENCLOSURE RINGS AND SHIELDS IN AN ELECTRICAL MACHINE

(75) Inventors: Christopher Anthony Kaminski, Schenectady, NY (US); Robert John Nygard, Saratoga Springs, NY (US); Nancy Lee Nichols, Niskayuna, NY (US); Anand Shankar Tanavde, Albany, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/926,067

(22) Filed: Aug. 26, 2004

(51) Int. Cl.⁷ .............................. H02K 1/22
(52) U.S. Cl. .................... 310/262; 310/216
(58) Field of Search .............. 310/216–218, 310/179, 201, 261–262

(56) References Cited

U.S. PATENT DOCUMENTS

| | | | |
|---|---|---|---|
| 4,363,982 A | 12/1982 | Kaminski | |
| 4,543,503 A | 9/1985 | Kaminski et al. | |
| 4,667,125 A | 5/1987 | Kaminski et al. | |
| 4,709,177 A | 11/1987 | Kaminski | |
| 4,814,655 A | 3/1989 | Kaminski | |
| 5,065,064 A | 11/1991 | Kaminski | |
| 5,281,877 A | 1/1994 | Kazmierczak et al. | |
| 5,358,432 A | 10/1994 | Shih et al. | |
| 5,635,785 A * | 6/1997 | Schwanda et al. | 310/270 |
| 5,719,452 A * | 2/1998 | Sugiura | 310/49 R |
| 5,886,434 A | 3/1999 | Nygard | |
| 5,929,550 A | 7/1999 | Kaminski et al. | |
| 5,986,380 A | 11/1999 | Kaminski et al. | |
| 6,081,178 A | 6/2000 | Wang et al. | |
| 6,181,228 B1 | 1/2001 | Laskaris et al. | |
| 6,194,807 B1 | 2/2001 | Kaminski et al. | |
| 6,198,371 B1 | 3/2001 | Laskaris et al. | |
| 6,201,462 B1 | 3/2001 | Laskaris et al. | |
| 6,239,527 B1 | 5/2001 | Kaminski et al. | |
| 6,246,308 B1 | 6/2001 | Laskaris et al. | |
| 6,291,919 B1 | 9/2001 | Ganti et al. | |
| 6,313,561 B1 | 11/2001 | Nygard et al. | |
| 6,339,268 B1 | 1/2002 | Kaminski et al. | |
| 6,346,753 B1 | 2/2002 | Jarczynski et al. | |
| 6,369,482 B1 | 4/2002 | Rink, Jr. et al. | |
| 6,415,613 B1 | 7/2002 | Ackermann et al. | |
| 6,437,476 B1 | 8/2002 | Nygard et al. | |
| 6,438,969 B1 | 8/2002 | Laskaris et al. | |
| 6,442,949 B1 | 9/2002 | Laskaris et al. | |
| 6,448,686 B1 | 9/2002 | Dawson et al. | |
| 6,495,942 B1 | 12/2002 | Kaminski et al. | |
| 6,590,311 B1 | 7/2003 | Wang et al. | |
| 6,759,770 B1 * | 7/2004 | Wang et al. | 310/52 |
| 2005/0116580 A1 * | 6/2005 | Cairo | 310/261 |

* cited by examiner

*Primary Examiner*—Thanh Lam
(74) *Attorney, Agent, or Firm*—Nixon & Vanderhye, P.C.

(57) ABSTRACT

Grooves are formed in the pole faces of a multi-pole rotor body. Spacers are provided for insertion into the grooves and have radial outward projections for engaging between shield segments and enclosure rings. By providing spacers with variable width projections, the axial gap between adjacent enclosure rings and shield segments is adjusted to adjust the ventilation flow from within the rotor body.

19 Claims, 6 Drawing Sheets

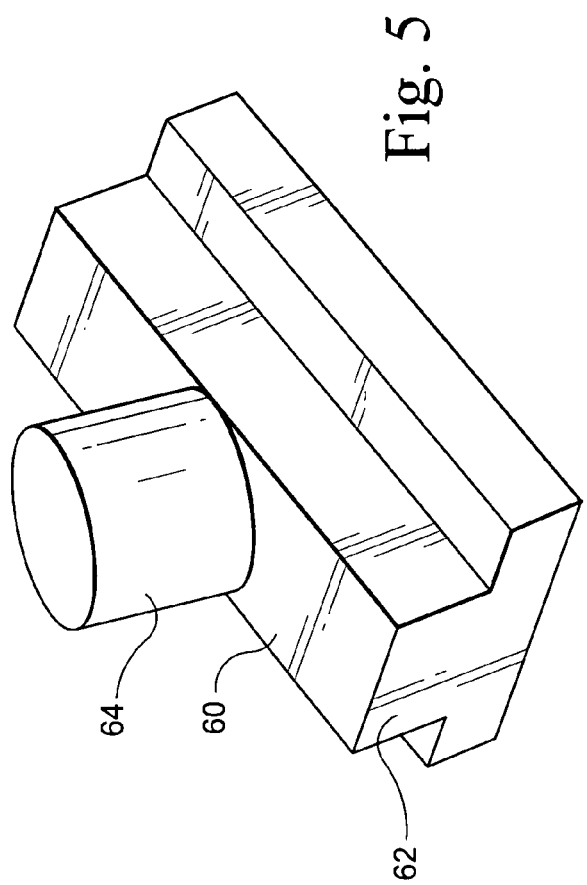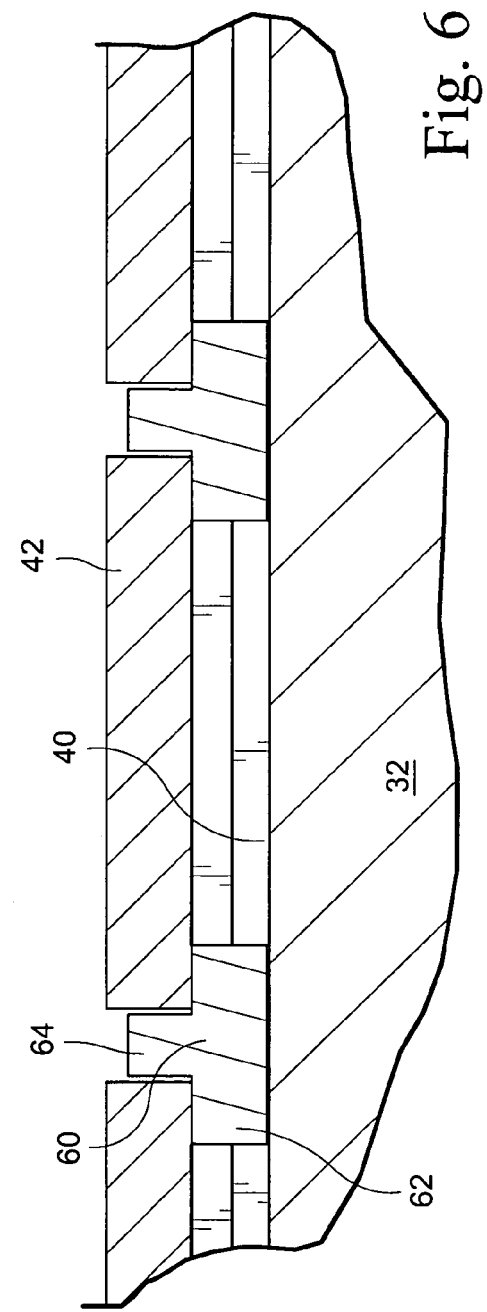

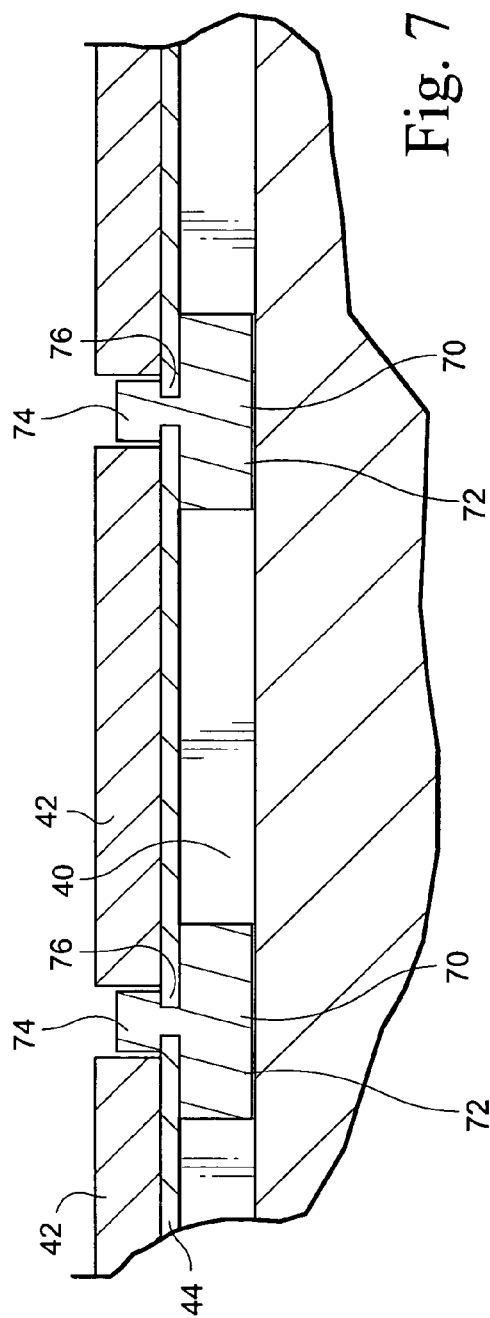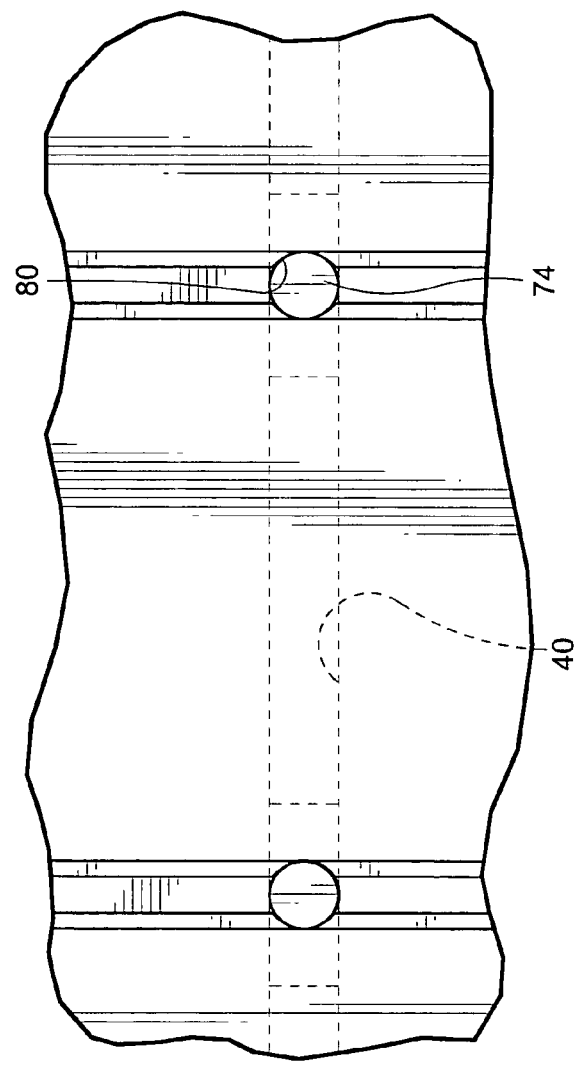

SPACER FOR AXIAL SPACING ENCLOSURE RINGS AND SHIELDS IN AN ELECTRICAL MACHINE

BACKGROUND OF THE INVENTION

The present invention relates to a rotor configuration for an electrical machine and particularly to spacers for axially spacing enclosure rings and annular shields about the pole faces and field winding modules of an electrical machine.

In a particular electrical machine, a rotor configuration includes a multi-pole rotor core for rotation about an axis. A plurality of field winding modules are respectively disposed about each pole of the multi-pole rotor core and an enclosure is disposed over the field winding modules to contain the latter about the rotor core. A magnetic shield is disposed about and between the field winding modules and the enclosure.

The enclosure, as well as the shield, forms part of a containment system for the windings. It will be appreciated that the windings in the rotor require cooling and typically a cooling medium flows through defined passages in the rotor and exits into the air gap between the rotor and the stator. Part of the enclosure includes rings. Accordingly, there is a need to maintain the enclosure rings about the field winding modules axially positioned relative to one another and along the rotor shaft to provide well-defined locations for radial discharge of the cooling medium, as well as to enable electrical connection of the amortisseur shield segments, while simultaneously affording assembly aids to render the rotor architecture easier to assemble.

BRIEF DESCRIPTION OF THE INVENTION

In an exemplary embodiment of the present invention, there is provided at least one groove along each of the pole faces of the rotor core. To maintain a pair of enclosure rings in a predetermined axial position relative to one another along the rotor core, a spacer is provided in the groove and extends outwardly between the pair of rings to maintain a predetermined axial spacing between the rings. The spacer may comprise a rectilinear base with a radial outward projection for engaging between the rings or a generally dovetail-shaped base for reception and retention in a complementary-shaped groove in the rotor core.

In another aspect of the present invention, the rotor shaft includes a multi-pole rotor core having field winding modules disposed about the rotor core, axially spaced enclosure rings disposed over the field winding modules, a groove extending along each pole of the rotor core, and shield segments between the enclosure rings and the rotor core. Spacers are provided in the groove of the rotor core with projections extending between the axially adjacent shield segments and enclosure rings. The spacers are formed of electrically conductive material whereby a continuous electrical current path is provided between axially adjacent shield segments. The gap between the shield segments, as well as the axially adjacent enclosure rings, may be controlled to throttle the cooling flow. To accomplish this, the end edges of the shield segments spaced from one another may have recesses for engaging about the radial projections of the spacers with the recesses being variously sized to control the spacing between opposed end edges of the shield segments. The end edges of the axially adjacent rings may butt the radial projections and thus be set back from the end edges of the shield segments.

In a preferred embodiment according to the present invention, there is provided a rotor for an electric machine comprising a rotor shaft including a multi-pole rotor core having pole faces, field winding modules respectively disposed on the rotor core, first and second axially spaced enclosure rings disposed over the field winding modules, the rotor core having a groove extending along each pole face of the rotor core and a first spacer disposed in each groove and between the first and second rings to maintain the pair of enclosure rings in a predetermined axial spacing relative to one another.

In a further preferred embodiment according to the present invention, there is provided an electric machine comprising a rotor having an axis, field windings disposed about the rotor, first and second axially spaced enclosure rings disposed over the field windings, the rotor having a pair of grooves extending along outer arcuate faces at circumferential locations about the rotor of the rotor and a first spacer disposed in each groove and between the first and second rings to maintain the pair of enclosure rings in a predetermined axial spacing relative to one another.

BRIEF DESCRIPTION OF THE DRAWINGS

FIG. 5 is a perspective view of a further form of spacer ring;

FIG. 6 is a fragmentary cross-sectional view of the rotor body taken generally about line 6—6 in FIG. 4;

FIG. 7 is a view similar to FIG. 6, illustrating spacers providing a gap between axially adjacent shields and enclosure rings;

FIG. 8 is a plan view thereof; and

DETAILED DESCRIPTION OF THE INVENTION

Figure 1:
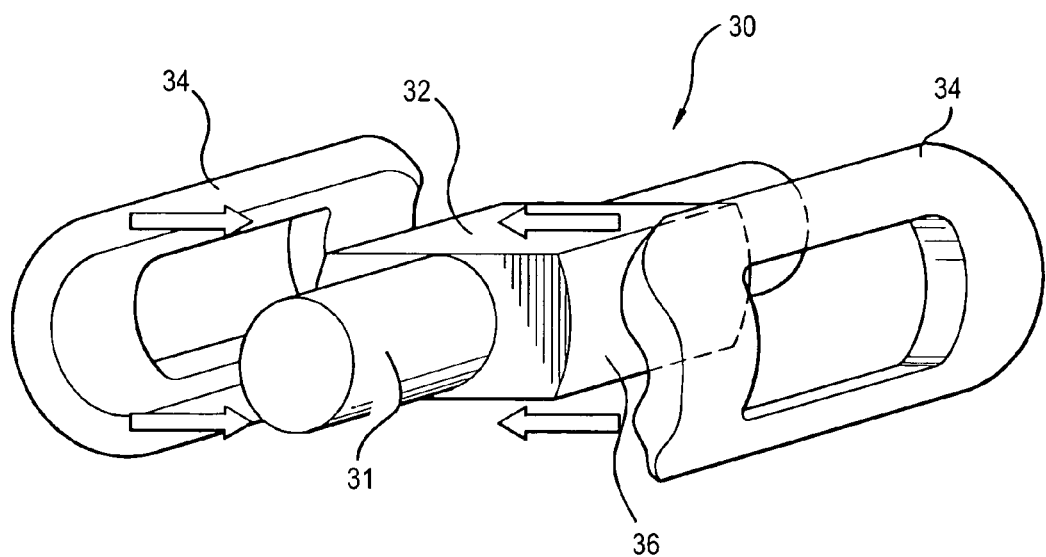
FIG. 1 is a perspective view of a preferred rotor in an electrical machine according to the present invention.
Figure 2:
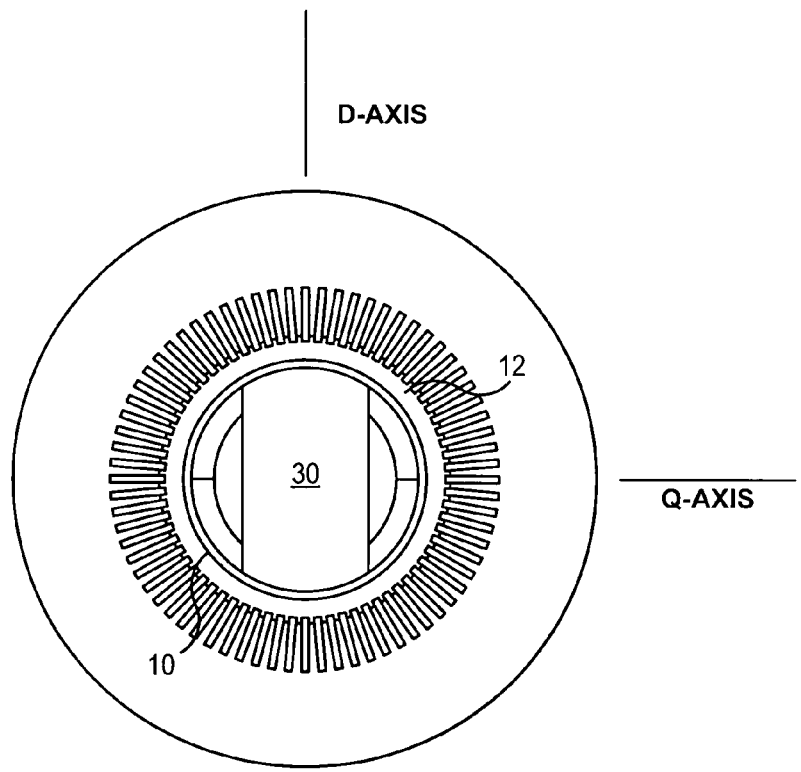
FIG. 2 is a schematic illustration of the rotor of FIG. 1 and a stator as viewed from an end of the electrical machine.

A generator rotor 30 includes a rotor shaft 31, a multi-pole magnetic core 32 (a two-pole core being shown) and a plurality of field winding assemblies 34, one for each pole, and corresponding pole faces 36. The construction and materials of the magnetic core 32 and winding assemblies 34 are known. The prefabricated winding assemblies are disposed over the parallel side forging forming the rotor body and are curved in an arc generally concentric with the rotor body. As illustrated in FIG. 2, the rotor is disposed within a stator and an air gap exists between an enclosure about the rotor and the inner surface of the stator. For orientation purposes, there is illustrated in FIG. 2 a quadrature axis Q extending normal to both the axis of rotation of the rotor and the flat side surfaces. The direct axis D extends normal to the Q axis and the axis of rotation.

Figure 3:
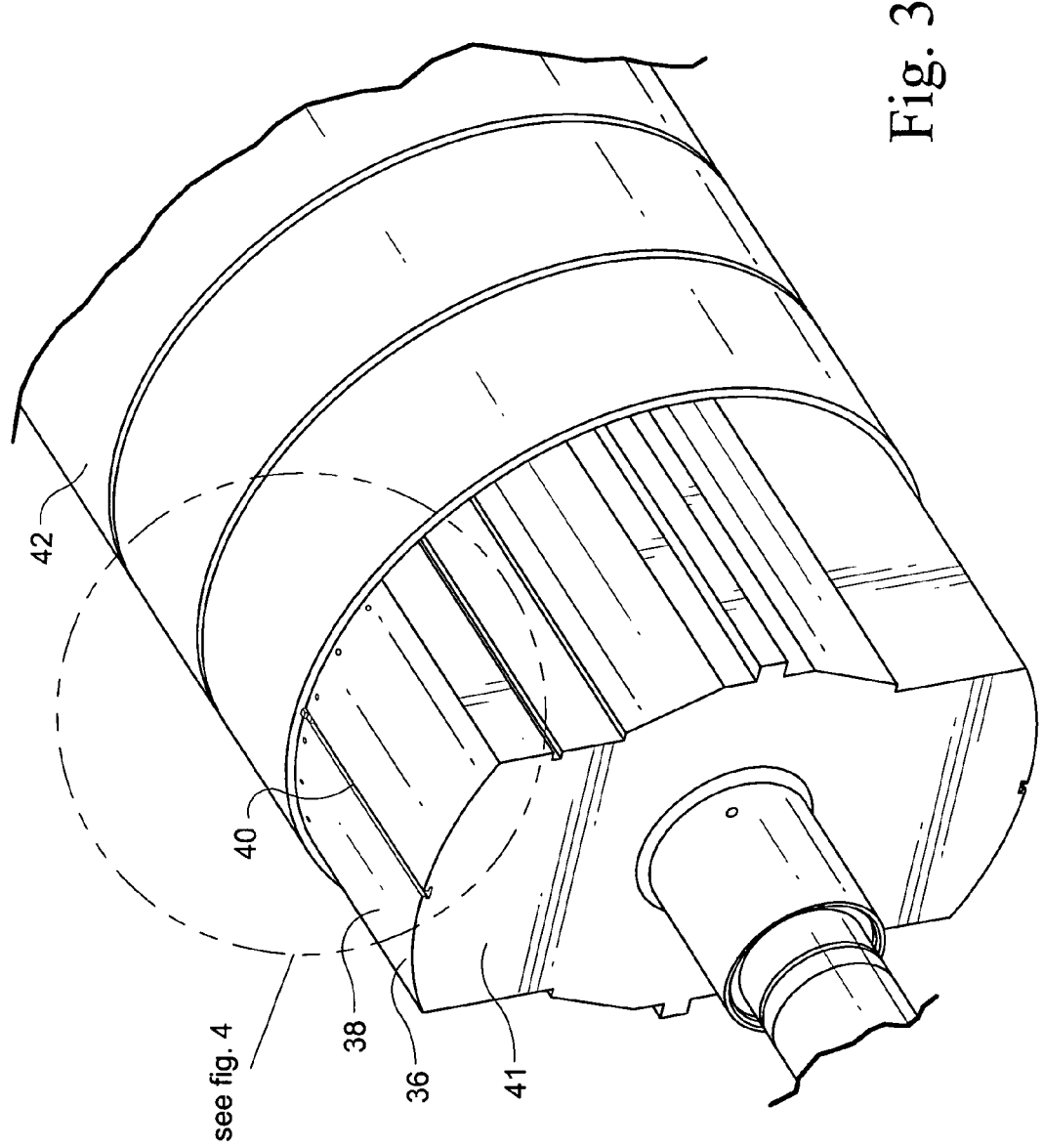
FIG. 3 is a fragmentary perspective view with parts removed illustrating the rotor body with axially spaced enclosure rings about the body.

Each rotor body pole face 36 includes, as illustrated in FIG. 3, an arcuate surface 38 having an axially extending groove 40 opening through an end face 41 of each pole.

While the groove may take many different forms, i.e., a rectilinear or keyhole shape, a dovetail-shaped groove 40 having a laterally enlarged base 47 (FIG. 4) is preferred. It will be appreciated that enclosure rings 42 are disposed about the rotor body, essentially encapsulating the rotor body and the field windings. Also, amortisseur shield rings or segments 44 (FIGS. 7–9) are disposed about the rotor body and field windings at axially spaced positions therealong underlying the enclosure rings 42. As noted previously, axially spacing the rings from one another provides vent passages for the field windings to dissipate heat from the rotor body into the gap between the rotor body and the stator. Also, it will be appreciated that the rotor body and field windings do not heat uniformly and therefore a variable spacing between the enclosure and shield rings is desirable. At the same time, it is desirable to provide well-defined locations for radial discharge of the cooling medium through the rotor body into the gap, to provide a means of electrically connecting the amortisseur shield segments and to provide an assembly aid to make the rotor architecture easier to assemble.

Figure 4:
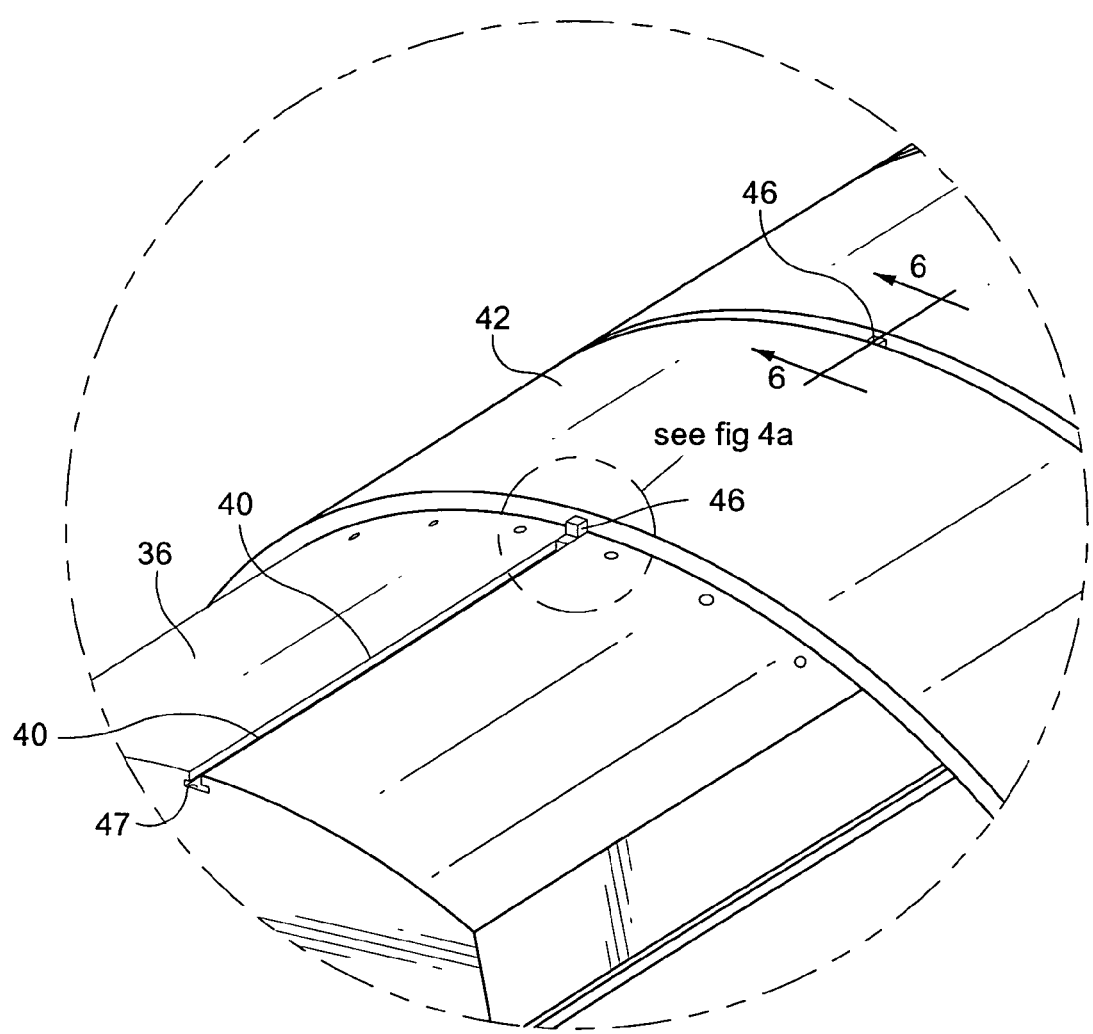
FIG. 4 is an enlarged fragmentary perspective view thereof.
Figure 4A:
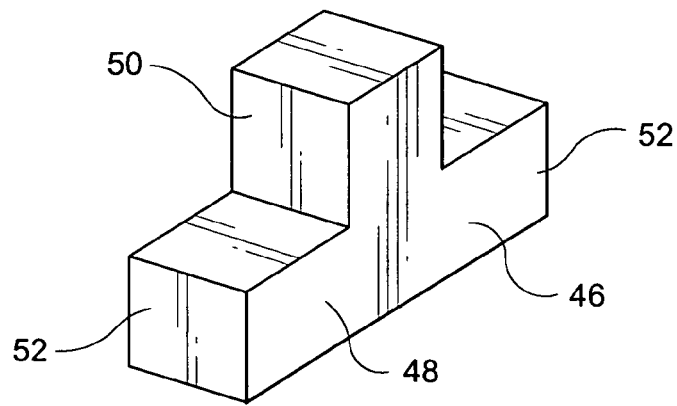
FIG. 4a is an enlarged perspective view of a spacer used to axially space the enclosure rings illustrated in FIGS. 3 and 4.

The various rings are axially spaced one from the other by spacers 46, as illustrated in FIGS. 4 and 4a. The spacers 46 include a base 48 and a projection 50 extending outwardly from base 48. In FIG. 4a, the spacer 46 is generally rectilinear, with the base 48 configured for sliding engagement along the slot 40 with the projection 50 extending above the surface of the pole face 36 sufficiently to be engaged by the shield and enclosure rings. Spacers 46 therefore may be inserted or placed within the groove 40 in sequence as the rings are placed about the rotor body. That is, the rings, i.e., one shield ring and one enclosure ring, may be placed on the rotor body alternating with spacers 46 located in the grooves 40 in each of the pole faces 36 whereby the sets of rings, i.e., shield and enclosure rings, may be axially spaced one from the other by the projections 50. The spacers need not be retained within the groove 40 since the legs 52 of the spacers 46 extend longitudinally beyond the projections 50 to underlie the rings 44 and 42. Thus, the rings maintain the spacers on the rotor body 32. It will be appreciated that the spacers restrain the enclosure and shield rings against axial movement and provide predictable ring spacing for discharge of field winding ventilation. Variable axial spacing can be achieved depending upon the rotor ventilation needs by enlarging or reducing the axial extent of the projection 50 of the predetermined spacers 46.

In FIGS. 5 and 6, the spacer is made of a different configuration than the spacer illustrated in FIG. 4a. Particularly, in FIGS. 5 and 6, the spacer 60 includes a dovetail-shaped base 62 having an upstanding, generally cylindrical projection 64 for extending out of the groove 40. Consequently, the spacer 60 requires axial installation into the groove 40, alternating with the axial disposition of the shield and enclosure rings. As with the prior embodiment, the rings may be variably axially spaced from one another along the rotor body by changing the thickness, i.e., diameter, of the projection 64. It will be appreciated that the spacers need not be fixed in the grooves 40 but are restrained in the grooves 40 by the overlying rings which are, after assembly, bonded to the rotor body. The capture of the spacers within the grooves thus does not complicate the assembly of the rings about the rotor.

Figure 9:
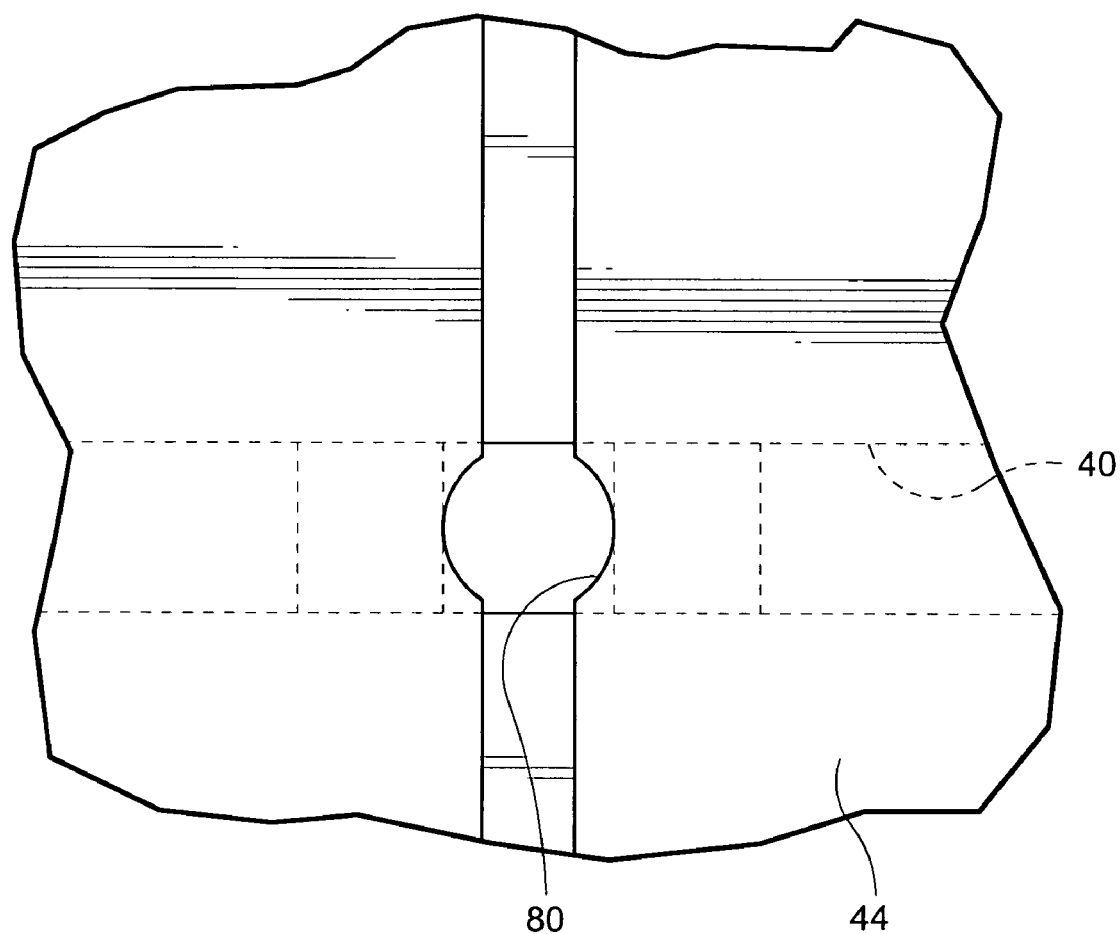
FIG. 9 is a plan view of the axially spaced shield.

A further form of spacer is illustrated, in FIGS. 7–9. In this form, the spacer 70 may have a rectilinear base 72 or a dovetail-shaped base as in the preceding embodiment, with a radial outward cylindrical projection 74 having undercuts 76 opening axially along opposite sides. Thus, the base 72 of the spacer 70 may be provided along the groove 40 with the shield rings engaging in the undercuts 76 along the projections 74. In this manner, the shield rings are axially spaced one from the other to a predetermined spacing, depending upon the thickness of the undercuts 76 of the cylindrical projections 74. As in the prior embodiments, the enclosure rings 42 are spaced one from the other by the cylindrical projections 74. As best illustrated in FIGS. 7 and 8, the shield rings are more closely axially spaced to one another than the enclosure rings 42 are axially spaced from one another. Consequently, the shields throttle the flow between the axially spaced enclosure rings 42.

In a preferred aspect of this embodiment of the invention, the shield rings 44 may have arcuate cutouts 80 (FIG. 9) overlying the groove 40 for engaging about the cylindrical projections 74. The spacer in this form may have a circular undercut radially outwardly of the base of the spacer with a rectilinear head on the projection. As a consequence, the arcuate slots 80 along the shield segments engage about the circular portion of the spacer, while the enclosure rings engage along the linear sides of the square projection on the head. It will be appreciated by placing a notch within the shield segments, the shields cannot rotate about the axis of the rotor.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A rotor for an electric machine comprising:
   a rotor shaft including a multi-pole rotor core having pole faces;
   field winding modules respectively disposed on the rotor core;
   first and second axially spaced enclosure rings disposed over the field winding modules;
   said rotor core having a groove extending along each pole face of the rotor core; and
   a first spacer disposed in each groove and between said first and second rings to maintain said pair of enclosure rings in a predetermined axial spacing relative to one another.

2. A rotor according to claim 1 wherein the rotor shaft is rotatable about an axis and said grooves extend along said pole faces in directions generally parallel to said axis.

3. A rotor according to claim 2 wherein said grooves open through at least one end face of each pole face to enable insertion of the spacers into the groove.

4. A rotor according to claim 1 wherein each of said grooves has a base within the pole face having a lateral extent in excess of the width of the groove opening through a face of the pole.

5. A rotor according to claim 1 wherein each said groove has a dovetail configuration and each said spacer has a corresponding dovetail configuration for reception within said groove.

6. A rotor according to claim 1 including a third enclosure ring, at least a second spacer in each groove spaced from said first spacer, said first ring being disposed axially between said first and second spacers, said second ring being disposed on one side of said first ring with said first spacer between said first ring and said second ring, said third ring being disposed on an opposite side of said first ring with said second spacer between said first ring and said third ring, thereby enabling said first spacer to axially space said first ring and said second ring from one another and said second spacer to axially space said first ring and said third ring from one another.

7. A rotor according to claim 6 wherein the axial spacing between said first and second ring is different than the axial spacing between said first ring and said third ring.

8. A rotor according to claim 1 including axially spaced electrically conductive generally annular shield segments disposed between the enclosure rings and the field winding modules and engaged with and on opposite sides of said spacers, said spacers being formed of electrically conductive material to provide a continuous electrical current path between spaced electrically conductive shield segments.

9. A rotor according to claim 8 wherein said shield segments adjacent said spacers have a closer axial spacing therebetween than the predetermined axial spacing between said first and second enclosure rings.

10. A rotor according to claim 9 wherein each of said spacers includes a generally radially outwardly extending projection engaged by said pair of enclosure rings and an undercut, said shield segments having recesses along marginal axially facing edges to at least partially envelop said undercuts.

11. An electric machine comprising:
a rotor having an axis;
field windings disposed about the rotor;
first and second axially spaced enclosure rings disposed over the field windings;
said rotor having a pair of grooves extending along outer arcuate faces at circumferential locations about the rotor of the rotor; and
a first spacer disposed in each groove and between said first and second rings to maintain said pair of enclosure rings in a predetermined axial spacing relative to one another.

12. A machine according to claim 11 wherein said grooves open through at least one end face of the rotor to enable insertion of the spacers into the grooves.

13. A machine according to claim 11 wherein each of said grooves has a base within and recess from the arcuate face of the rotor, said base having a lateral extent in excess of the width of the groove opening through the end face of the rotor.

14. A machine according to claim 11 wherein each said groove has a dovetail configuration and each said spacer has a corresponding dovetail configuration for reception within said groove.

15. A machine according to claim 11 including a third enclosure ring, at least a second spacer in each groove spaced from said first spacer, said first ring being disposed axially between said first and second spacers, said second ring being disposed on one side of said first ring with said first spacer between said first ring and said second ring, said third ring being disposed on an opposite side of said first ring with said second spacer between said first ring and said third ring, thereby enabling said first spacer to axially space said first ring and said second ring from one another and said second spacer to axially space said first ring and said third ring from one another.

16. A machine according to claim 15 wherein the axial spacing between said first and second ring is different than the axial spacing between said first ring and said third ring.

17. A machine according to claim 11 including axially spaced electrically conductive generally annular shield segments disposed between the enclosure rings and the field windings and engaged with and on opposite sides of said spacers, said spacers being formed of electrically conductive material to provide a continuous electrical current path between spaced electrically conductive shield segments.

18. A machine according to claim 17 wherein said shield segments adjacent said spacers have a closer axial spacing therebetween than the predetermined axial spacing between said first and second enclosure rings.

19. A machine according to claim 18 wherein each of said spacers includes a generally radially outwardly extending projection engaged by said pair of enclosure rings and an undercut, said shield segments having recesses along marginal axially facing edges to at least partially envelop said undercuts.

* * * * *